Oct. 27, 1970     D. A. HAYNES     3,535,938

WHEEL BALANCING DEVICE

Filed Feb. 20, 1968     6 Sheets-Sheet 1

INVENTOR.
DON A. HAYNES

BY F. W. Anderson
C. E. Tripp

ATTORNEYS

Oct. 27, 1970

D. A. HAYNES 3,535,938

WHEEL BALANCING DEVICE

Filed Feb. 20, 1968

INVENTOR.
DON A. HAYNES

BY *F. W. Anderson*
*C. E. Tripp*

ATTORNEYS

FIG_14

FIG_15

FIG_16

FIG_17

Oct. 27, 1970   D. A. HAYNES   3,535,938
WHEEL BALANCING DEVICE
Filed Feb. 20, 1968   6 Sheets-Sheet 6

FIG_18

FIG_19

FIG_20

FIG_21

INVENTOR.
DON A. HAYNES
BY F. W. Anderson
C. E. Tripp
ATTORNEYS

United States Patent Office 3,535,938
Patented Oct. 27, 1970

3,535,938
WHEEL BALANCING DEVICE
Don A. Haynes, Okemos, Mich., assignor to FMC Corporation, San Jose, Calif., a corporation of Delaware
Filed Feb. 20, 1968, Ser. No. 706,944
Int. Cl. G01m 1/38
U.S. Cl. 73—473                    12 Claims

ABSTRACT OF THE DISCLOSURE

A wheel balancing device has a stationary base with a head pivotally received thereon. A shaft journaled in the head receives a wheel for balancing. A laterally shiftable disc on the shaft is displaced by an abutment member an amount corresponding to shaft oscillation (caused by an unbalanced wheel). A clamp in the base is actuated by forward movement of a handle to restrain the shaft from oscillation and clamp the disc in the displaced position. The handle is moved forwardly into the wheel to stop rotation thereof.

Background of the invention

The present invention relates to wheel balancing devices particularly suited for static and dynamic balancing of automobile wheel and tire assemblies.

A wheel and tire assembly will be in static balance when the weight of the wheel and tire assembly is equally distributed around the axis of rotation so that the wheel and tire assembly, when freely rotatable in a vertical plane, will have no tendency in any angular position to rotate under the force of gravity. A wheel and tire assembly will be in dynamic balance when it is in static balance and when no couples are generated during rotation tending to cause the rotating wheel and tire assembly to wobble. A device for dynamically balancing wheel and tire assemblies should be capable of indicating to an operator the extent of the unbalance in a wheel and tire assembly to inform the operator how large a weight must be added to the wheel, and should be capable of indicating to an operator the axis and direction of the unbalance to inform the operator where on the wheel the weight must be placed to correct the unbalance. In dynamic balancing of a wheel and tire assembly, this information must be gleaned while the wheel and tire assembly is rotating, and it is understandable why some balancers are large and complex, often incorporating delicate mechanisms. Not only are these devices costly and cumbersome, best suited for permanent installations, but are difficult to operate without highly trained personnel who are not always available.

Summary of the invention

In the present invention, a mechanism is provided for the static and dynamic balancing of wheels or wheel and tire assemblies which is compact, with simple, rugged mechanism, and, more importantly, is simple enough for inexperienced personnel to operate. However, precise balancing of a stationary or rotating wheel can be quickly effected. In brief, the mechanism of the present invention comprises a head having a shaft journaled therein and extending therefrom to receive a wheel for balancing. The head is mounted on a stationary base for pivotal movement about a pivot axis inclined substantially 45 degrees from the axis of the wheel receiving shaft. The head, when unrestrained, oscillates from side to side about said pivot axis when an unbalanced wheel is rotated on the head shaft, the amplitude of the oscillation depending on the amount of unbalance in the wheel. A tail stock is mounted on the base which is selectively effective to restrain the rotating head shaft from oscillation. A disc is mounted on the head shaft, and the disc is clamped thereon when the tail stock restrains the rotating head shaft. The disc is unclamped and can be shifted laterally on the head shaft when the head shaft is unrestrained. An operating handle extending from the base is effective, when moved rearwardly by the operator, to actuate the tail stock and release the shaft for oscillation by an unbalanced rotating wheel. An abutment member having a signaling rod thereon is mounted in the base and is moved by the handle to engage one side of the disc and shift the disc laterally on the head shaft. The signaling rod vibrates until the disc has shifted an amount corresponding to the amplitude of oscillation of the head shaft (and thus an amount corresponding to the amount of unbalance in the wheel). The termination of vibration of the rod informs the operator to terminate rearward movement of the handle.

The handle, when pulled forward to the wheel, actuates the tail stock to restrain the shaft from oscillation, clamp the disc in the displaced position, and brakes the wheel. After the disc has been clamped to the head shaft in a a position displaced an amount corresponding to the amount of unbalance in the wheel, and displaced along an axis corresponding to the axis of the unbalance, a sensing member, actuated by a control member in the handle, senses the position of the disc and operates an indicator in the handle to give a visual indication to the operator of the amount of unbalance in the wheel. The handle thus serves not only to actuate the operating members of the wheel balancing device of the present invention, but also serves to coordinate the actuation of the operating members when moved through a simple cycle to give a quick, precise, reading of the unbalance to the operator.

It is therefore one object of the present invention to provide a simple, compact device for dynamic and static balancing of wheels and wheel and tire assemblies. It is another object of the present invention to provide a wheel balancer in which the wheel receiving shaft can be restrained from oscillation for mounting and removing wheels and for taking readings. It is still another object of the present invention to provide a wheel balancer in which the operating members are actuated by the handle. It is yet another object of the present invention to provide a wheel balancing device in which actuation of the operating members thereof is coordinated by movement of the handle. It is still another object of the present invention to provide a wheel balancer in which a signal is automatically given when the mechanism is ready for a reading of the unbalance. It is yet another object of the present invention to provide a wheel balancer which can give a reading calibrated for a plurality of sizes of tires.

Brief description of the drawings

FIG. 6 is a view taken on the lines 6—6 of FIG. 4;

FIG. 8 is a view taken on the lines 8—8 of FIG. 4;

Description of preferred embodiments

Figures 1, 2:
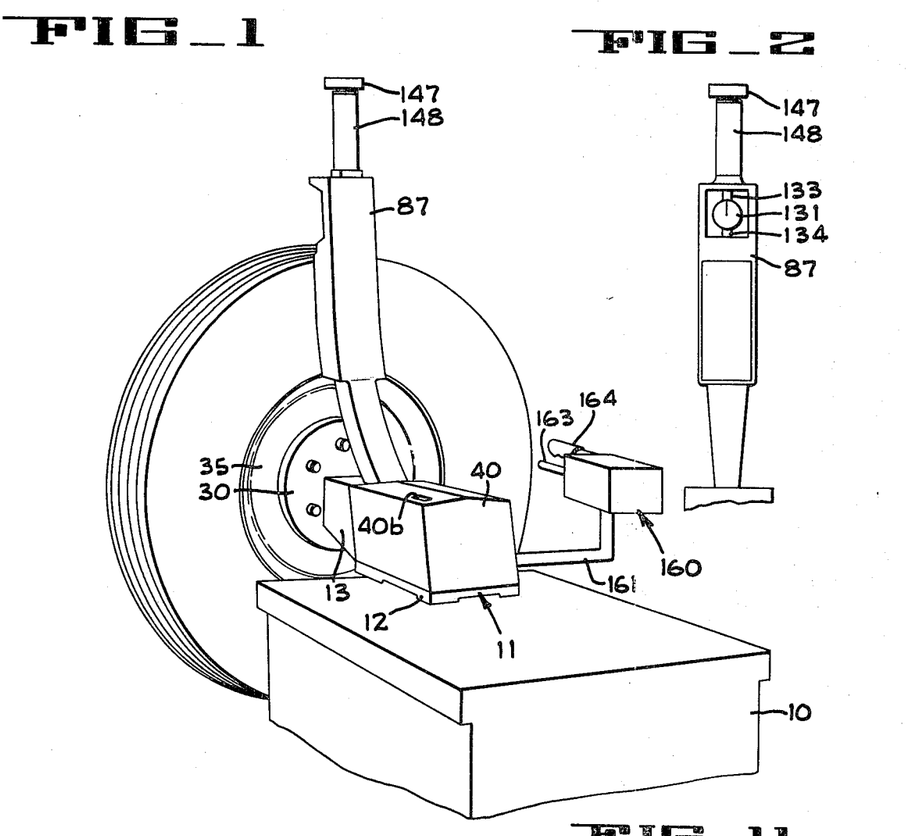
FIG. 1 is a view in perspective of the wheel balancer of the present invention mounted on a stand showing a wheel and tire assembly received on the wheel balancer for balancing.
FIG. 2 is a front view of the wheel balancer operating handle.
Figures 3, 5:
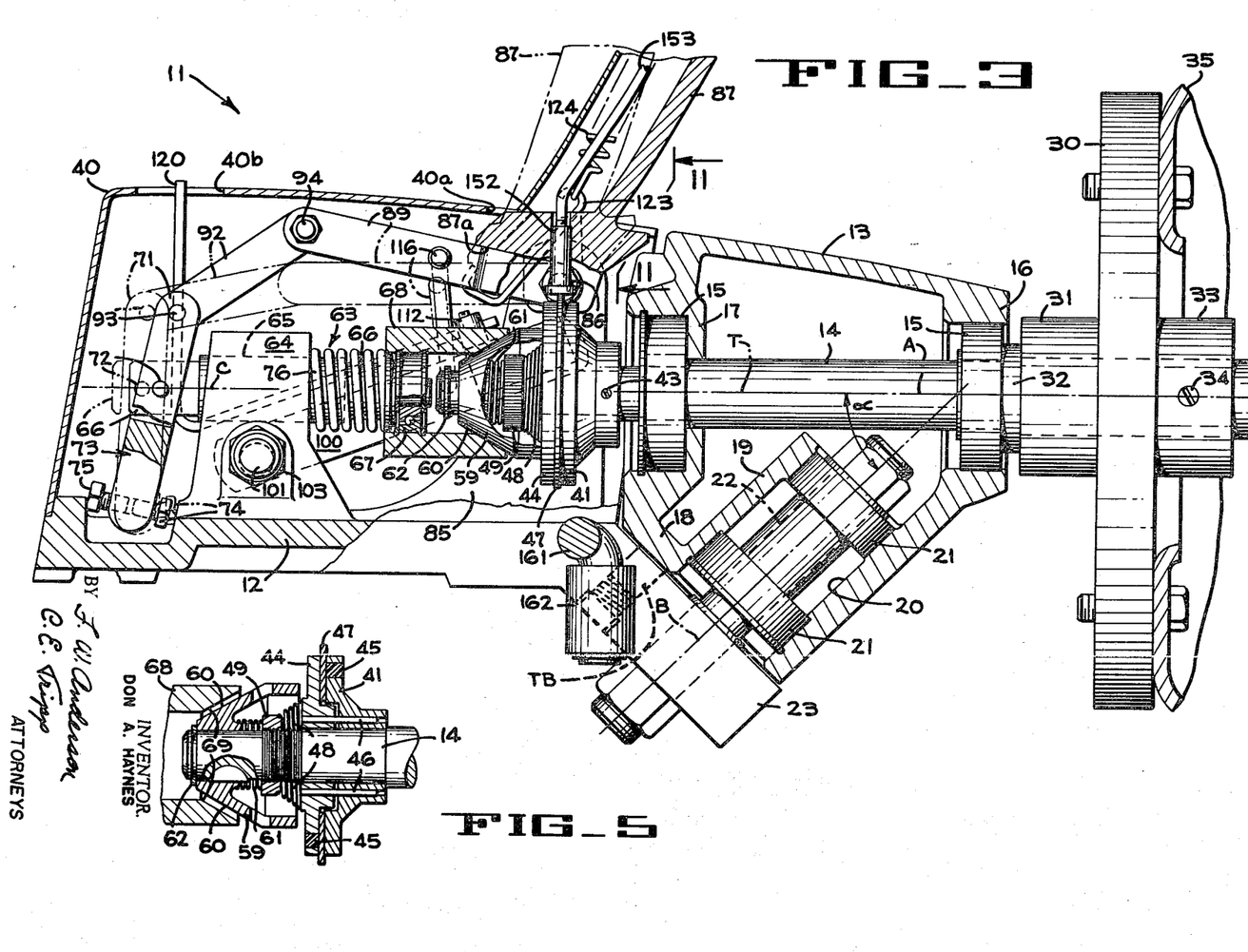
FIG. 3 is a side view in cross section of the wheel balancer.
FIG. 5 is a side fragmentary view showing the floating disc and clutch members when the shaft on which the wheel is received is unrestrained to oscillate.

There is shown in FIG. 1 a stand 10 upon which the wheel balancer, indicated generally at 11, is mounted. The wheel balancer has a stationary base 12 which is secured to the stand 10. As shown in FIG. 3, a head 13 has a shaft 14 received for rotation in axis A in two roller bearings 15 which are secured respectively, on axis A in the front wall 16 and rear wall 17 of the head. The head has a lower sloping wall 18 with a boss 19 extending upwardly therefrom. A stepped bore 20 in boss 19 has two spaced roller bearings 21 secured therein on a pivot axis B. A pivot shaft 22 is received in bearings 21 for rotation in axis B which intersects axis A at an angle $\alpha$ of, preferably, 45 degrees. The outer end of pivot shaft 22 extends outside head 13 and is secured in a downwardly sloping wall 23 of the base 12.

The head shaft 14 extends forwardly and rearwardly from the head. The forward end of shaft 14 receives a plate 30 between a spacer 31, which abuts against a collar 32 on the shaft 14, and a locking ring 33 which is secured to shaft 14 by set screw 34. A wheel 35 is bolted to the plate 30.

The base 12 has a housing 40 mounted thereon, and the head shaft extends rearwardly into the base housing. A backing member 41 is secured to shaft 14 by set screw 43, and a pressure member 44 is slidably received on shaft 14. Guide pins 46, tightly secured in pressure member 44, are slidably received in back member 41. An annular disc, or washer, 47 is received on shaft 14 between backing member 41 and pressure member 44. Teflon buttons 45, received in the backing member and the pressure member, define bearing surfaces to engage both sides of the disc in planes normal to axis A. A spring 48 is received on shaft 14 between pressure member 44 and a nut 49 which is threadedly received on shaft 14. The spring 48 normally applies pressure to the faces of the washer to hold the washer in position between the backing member and the pressure member in the absence of any significant lateral force applied to the washer. When a lateral force is applied to the washer, the washer will float, or shift, laterally in the absence of any longitudinal clamping force and the washer, or disc, 47 may therefore be considered a floating disc.

A male clutch cone 59 having a conical face 60 is slidably mounted on the rear end of shaft 14 and keyed thereto. A spring 61, received on shaft 14 between the clutch cone 60 and nut 49, normally urges the clutch cone 60 rearwardly into engagement with a snap ring 62 secured on the shaft 14.

A tail stock, or clamp indicated generally at 63, is mounted on the base. The base has an upstanding pedestal 64 which receives a bushing 65 on a fixed horizontal axis C. Bushing 65 slidably receives a shaft 66 on the forward end of which is secured a roller bearing 67. A female clutch member 68, having a conical face 69 complementary to the coniacl face 60 of clutch member 59, is received on bearing 67 for rotation relative to shaft 66. A pair of upstanding arms 71 of a U-shaped link 73 are pivotally connected at 72 to shaft 66. Opposed set screws 74, 75 are received in the bottom of link 73. A spring 76 is received on shaft 66 between the clutch member 68 and the pedestal 64 normally to urge shaft 66 forwardly to engage clutch member 68 with clutch member 59. The spring 76 is stronger than spring 61, and the longitudinal pressure applied by spring 76 through clutch member 68 to clutch member 59 urge clutch member 59 against presure member 44 to clamp the washer 47 tightly between pressure member 44 and backing member 41. Pedestal 64, bushing 65, shaft 66, bearing 67, clutch member 68, and spring 76 define the tail stock 3.

Figures 3, 4, 5, 7:
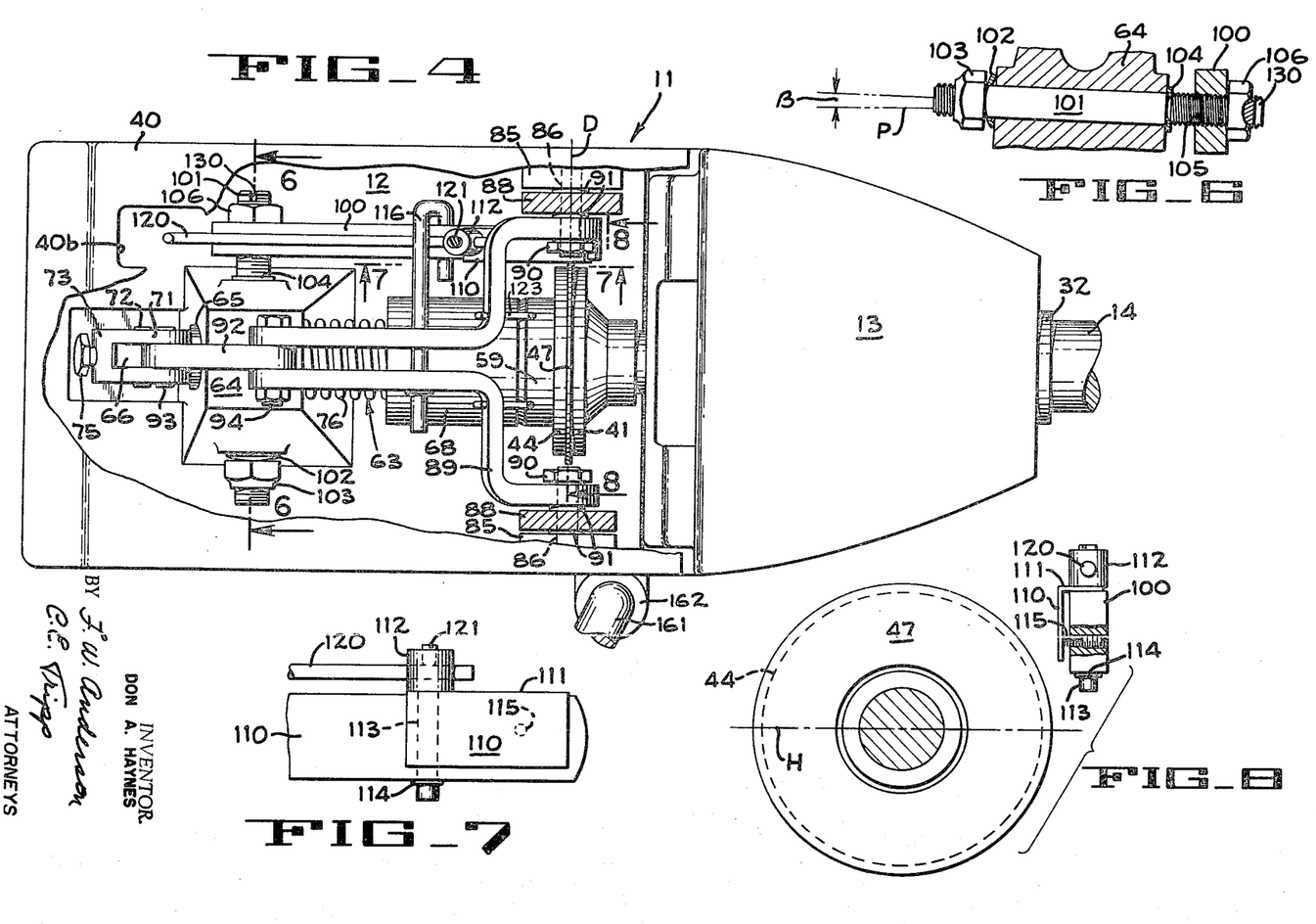
FIG. 4 is a top view, with parts broken away, of the wheel balancer.
FIG. 7 is a view taken on the lines 7—7 of FIG. 4.

As shown best in FIG. 4, the base 12 has, at each side, an upstanding standard 85 which receives a pivot pin 86 on axis D. A handle, or arm, 87, which normally extends upwardly through an opening 40a in the base housing, has, at each side, a depending ear 88 which is pivotally received on the pin 86. A toggle link 89 is received on pivot pin 86 at each side, and a nut 90, threadedly engaged on the end of the pivot pin, holds the members on the pins in assembled relationship. Washers 91 are received between the members on the pivot pins. The arm 87 has a ledge, or contact surface, 87a (FIG. 3) extending across the bottom of the arm and rearwardly of pivot axis D. The ledge normally engages the upper surface of toggle links 89. The toggle links 89, which extend inwardly and then rearwardly, are pivotally connected, at 94, to one end of an intermediate link 92. The opposite end of intermediate link 92 is pivotally connected, at 93, to link arms 71. With this construction, swinging movement of the handle rearwardly about axis D (as indicated in phantom lines in FIG. 3), depresses links 89 to straighten the linkage defined by links 89 and 92. This urges pivot point 93 rearwardly to swing link arms 71 about a fulcrum defined by engagement of set screw 74 with the base. The rearward, counterclockwise swinging of links 71 about a fulcrum at screw 74, pulls tail stock shaft 66 rearwardly to disengage clutch member 68 from clutch member 59, as shown in FIG. 5.

When head shaft 14 is unrestrained by tail stock 63, and shaft 14 is rotating with a perfectly balanced wheel thereon, the axes A and C would both lie in a fixed axis T and the head would be stationary on the base. However, if the wheel on rotating shaft 14 is unbalanced, the head will oscillate on the base about pivot axis B, and shaft 14 will oscillate with respect to the base. Thus axis A will swing from one side to the other of the stationary axis T, as shown in diagrammatic FIGS. 14, 15, 16 and 17, in which movements have been exaggerated for clarity. Although axis A swings in an arc through axis T, the radius of the arc is so large compared to the extent of lateral movement of axis A from axis T, the arc may be considered infinite, and the movement of axis A with respect to axis T may be considered linear through axis T on a horizontal axis I. A spring urged Teflon button TB mounted in the base presses against the head 13 to dampen the oscillations thereof.

The amplitude of the oscillation of shaft 14 (that is, the maximum distance axis A moves away from axis T) is a measure of the unbalance of the wheel, and the disc 47 is displaced from a centered position with respect to shaft 14 an amount equal to the amplitude of oscillation to indicate the wheel unbalance. The disc 47 is displaced with respect to shaft 14 by an abutment member 100, which is received on shaft 101 as shown best in FIGS. 4 and 6. The shaft 101 is mounted in pedestal 64 and lies in a vertical plane but is inclined an angle $\beta$ (which may, for example, be 2 degrees) with respect to a horizontal axis P as shown in FIG. 6. The shaft 101 is held in pedestal 64 by spring washer 102, which abuts against nut 103 threadedly received on the shaft, and snap-ring 104. The abutment member, or arm, 100 has a threaded bore 105 inclined at angle β with respect to an axis (not shown) normal to the sides of the abutment member to threadedly receive shaft 101. Thus arm 100 lies in a vertical plane on the cantered shaft 101. The arm is locked on the shaft by nut 106.

As shown best in FIGS. 7 and 8, a flapper plate 110, which defines a vertical abutment surface, has a flange 111 soldered to the underside of the head 112 of a pin 113. Pin 113 is received in a bore extending vertically through the abutment arm 100 at the outer end thereof and is retained therein by snap-ring 114. The flapper plate 110 pivots with respect to arm 100 about an axis defined by pin 113. The outer end of the flapper plate 110 is normally urged away from the outer end of arm 100 by spring 15 which is received between the flapper plate and the arm.

As shown in FIGS. 3 and 4, the arm 100 is connected by rod 116 to links 89 which are actuated by operating handle, or arm, 87. When the operating handle 87 is upright, the tail stock 63 is engaged with the clutch member on head shaft 14, and the abutment member 100 will be held in its upper position as indicated in FIG. 3. At that time, the arm 100 and flapper plate 110 are above and outboard of the disc 47, as shown in FIG. 8. When the operating handle is pushed rearwardly by the operator, tail stock releases the shaft 14 on which the wheel is mounted and the arm 100 and flapper plate 110 move down and in toward the disc 47 (by virtue of the cant of shaft 101 in pedestal 64).

Figure 14:
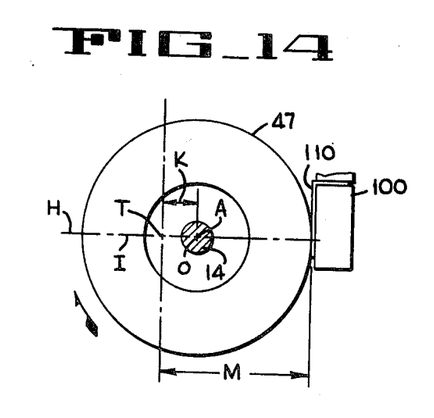
FIGS. 14, 15, 16 and 17 are schematic views of the floating disc and the oscillating head shaft as the disc is being displaced relative to the shaft by the abutment member.

Let is be assumed that the shaft 14 is oscillating at an amplitude of K about a theoretical stationary axis T (the axis on which shaft 14 would be stationary if the wheel were perfectly balanced) as shown in FIG. 14. The amplitude K may, in a typical case, be 0.010 inch. Let it also be assumed that the annular disc 47 (which has an imaginary center O) is centered with respect to axis A of shaft 14. After the shaft 14 is released by the tail stock, the shaft 14 will oscillate from one extreme position to the opposite extreme position on each half revolution of the wheel. The flapper plate 110 will initially strike the disc on a horizontal axis H through the imaginary center O of the disc, and as the operator continues to push the operating handle 87 rearwardly, the arm 100 will continue to drop and move in toward the disc until, as shown in FIG. 14, the flapper plate has pivoted into the arm and the arm begins to push the disc 47 off center, relative to shaft 14, and toward the theoretical stationary axis T.

Figure 15:
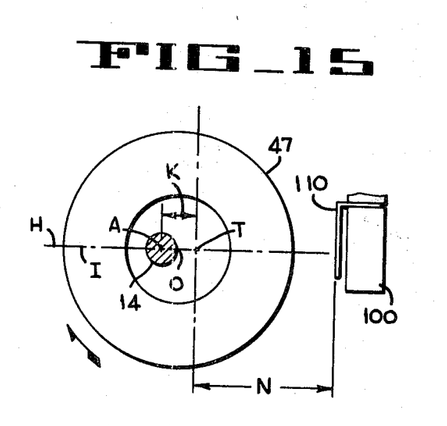
Figure 16:
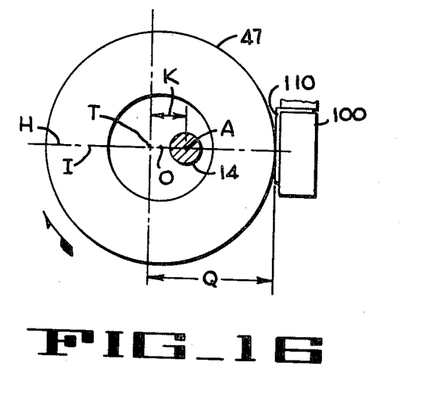

As shaft 14 rotates 180 degrees (and oscillates from the extreme position on one side of theoretical axis T, as shown in FIG. 14, to the extreme position on the opposite side of axis T, as shown in FIG. 15), the disc draws away from the flapper plate 110 which, during this time, has advanced from a distance M from the theoretical axis T to a smaller distance N therefrom. As shaft 14 rotates through another 180 degrees, as shown in FIG. 16, and moves again to its opposite extreme position, the disc pushes into the advancing flapper plate, which pivots against the arm 100. As the flapper plate and arm advance toward the stationary theoretical axis T (to a distance Q therefrom which is less than the distance N), the disc is pushed farther off center with respect to axis A of shaft 14 and is pushed closer to centered relationship with theoretical axis T. As shaft 14 continues to rotate, and arm 100 continues to descend and advance toward the theoretical center T, the flapper plate will continue to flutter (by virtue of the retreat of shaft 14 and disc 47 from the arm 100 on each revolution of shaft 14) until the center O of the disc is moved to the theoretical stationary axis T, as shown in FIG. 17, when the flapper plate reaches a distance R from the flapper plate which is less than the distance Q, and which equals the radius of the disc.

Figures 9, 10, 13:
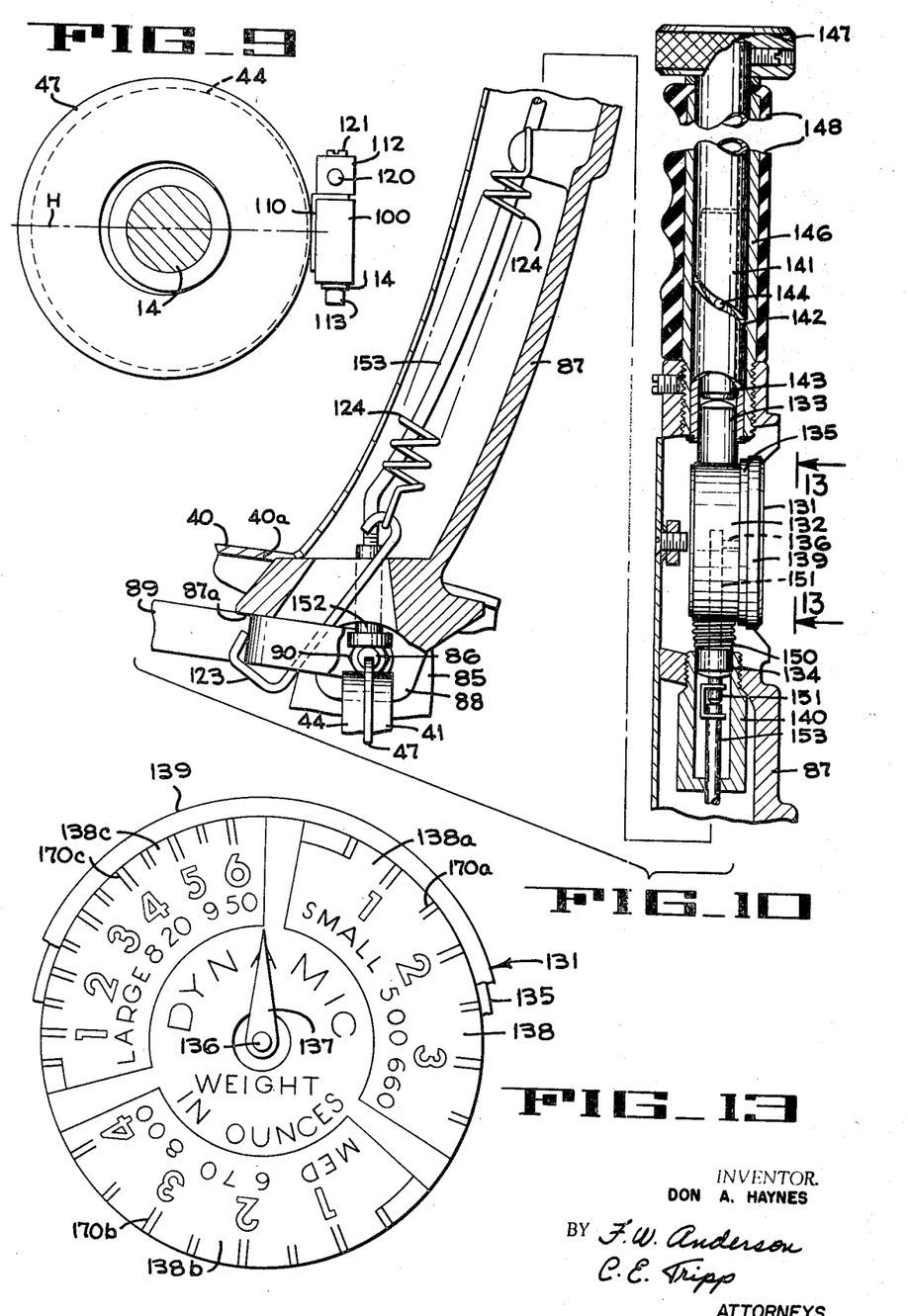
FIG. 9 is a view similar to FIG. 8 but after the abutment arm has been lowered and the disc shifted thereby.
FIG. 10 is a side view showing the operating handle of the wheel balancer.
FIG. 13 is a view taken on the lines 13—13 of FIGURE 10.
Figure 17:
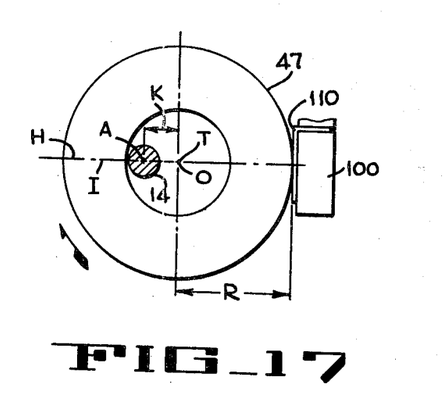

When the center O of the disc 47 lies on the stationary axis T, the periphery of the disc will no longer retreat from the flapper plate 110, and the flapper plate will remain engaged with arm 100, as shown in FIGS. 9 and 17, to terminate the vibration of the flapper plate. This can best be understood by reference to FIGS. 18, 19, 20 and 21, in which movements have been exaggerated for clarity.

Figure 18:
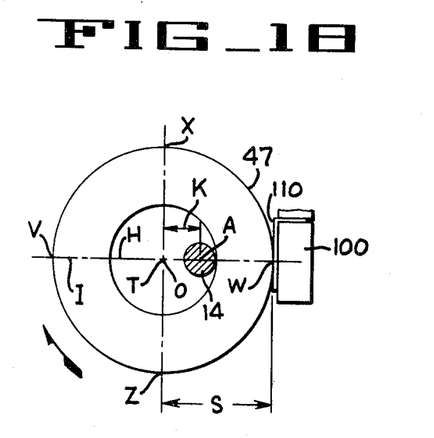
FIGS. 18, 19, 20 and 21 show the relationship between the head shaft, floating disc, and abutment member including the flapper plate thereof during one revolution after the disc has been displaced on the head shaft an amount equal to the amplitude of oscillation of the head shaft.
Figure 19:
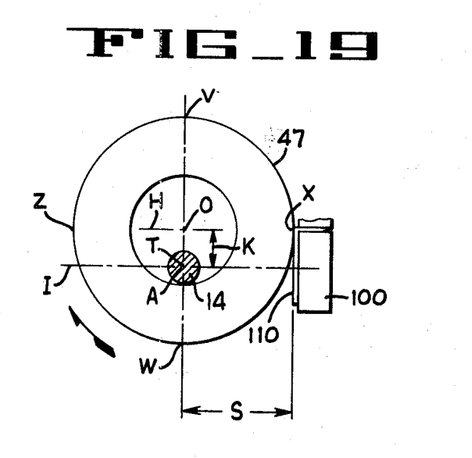
Figure 20:
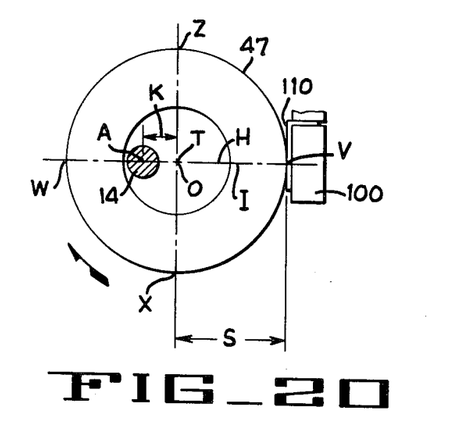
Figure 21:
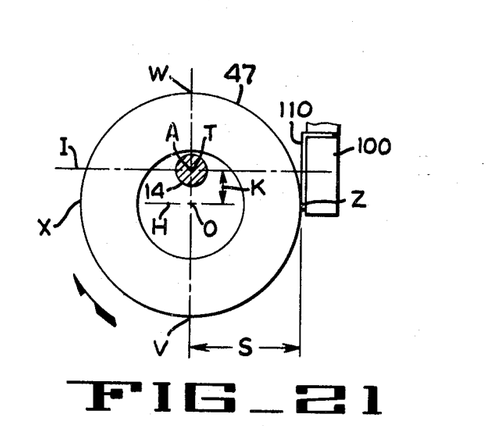

As shaft 14 continues to oscillate with amplitude K on a horizontal axis I intersecting axis T, and shaft 14 continues to rotate, assume an imaginary point W on the periphery of disc 47 is in contact with flapper plate 110 at a given instant as shown in FIG. 18. Assume also that during one revolution of shaft 14, as depicted in FIGS. 18, 19, 20 and 21, that the flapper plate remains a constant distance S from the stationary axis T. After 90 degrees of rotation of shaft 14 from the position shown in FIG. 18 to the position shown in FIG. 19, the shaft 14 has moved laterally to the center of its oscillating cycle (on axis T), and disc 47 has rotated to bring an imaginary point X into contact with flapper plate 110. Although the shaft 14 has retreated from the flapper plate, the periphery of the disc has not because the distance from axis A of shaft 14 to point X is greater than the distance of axis A from point W by an amount substantially equal to the distance shaft 14 has moved away from flapper plate 110. Similarly, as shaft 14 continues to retreat from flapper plate 110, on the next quarter revolution of shaft 14 and disc 47, the disc margin remains in contact with flapper plate 110, as shown in FIG. 20, where imaginary point V engages the flapper plate. On the next quarter turn of shaft 14 and disc 47, shaft 14 begins to move toward flapper plate 110 but, at the same time, the distance between axis A and the periphery of disc 47 in contact with the flapper plate diminishes so that the margin of the disc on the horizontal axis through the center O of the disc remains engaged with the flapper plate. When imaginary point Z on disc 47 engages the flapper plate, as shown in FIG. 21, the disc 47 will have completed ¾ of a revolution from the position shown in FIG. 18. As the shaft and disc complete the full revolution, returning to the positions shown in FIG. 18, shaft 14 continues to approach flapper plate 110 but the distance between shaft 14 and the margin of the disc at plate 110 diminishes a corresponding amount. Thus, it will be seen that the disc 47, which is off-center with respect to shaft 14, is orbiting with respect to shaft 14. However, at the same time, the shaft is oscillating from side to side at the same frequency (that is, one complete oscillation of shaft 14 for each revolution of shaft 14). The resultant motion of disc 47 with respect to stationary axis T is a vertical oscillation but no horizontal oscillation.

Thus, it will be seen from FIGS. 14 to 17 that as the abutment member 100 descends and approaches the stationary axis T, the disc 47 will be pushed off center with respect to axis A of shaft 14 and that the flapper plate 110 will vibrate until the disc 47 is off center with respect to axis A an amount equal to the amplitude of the oscillation of shaft 14 with respect to stationary axis T, which is the axis shaft 14 would lie in if it carried a perfectly balanced wheel. It will be seen from FIGS. 18 to 21 that after the disc 47 has been displaced on shaft 14 an amount equal to the distance of the maximum movement of the axis A of shaft 14 from axis T, the horizontal movement of disc 47 will cease and the flapper plate 110 will stop vibrating.

As shown in FIG. 7, a signaling rod 120 is secured by set screw 121 in head 112 of the pivot pin 113 of flapper plate 110. The rod, as shown best in FIG. 3, extends parallel to arm 100 and to the inner end of the arm and there bends upwardly to extend through an opening 40b in the housing 40. Thus the operator, as he pushes the operating handle 87 rearwardly, can watch the rod for a signal to indicate that the disc 47 has been displaced from centered relationship on shaft 14 an amount equal to the amplitude of the oscillations of shaft 14. When the rod stops vibrating, the operator pulls the handle 87 forwardly into engagement with the wheel (or, more specifically, the tire thereon).

Figures 11, 12:
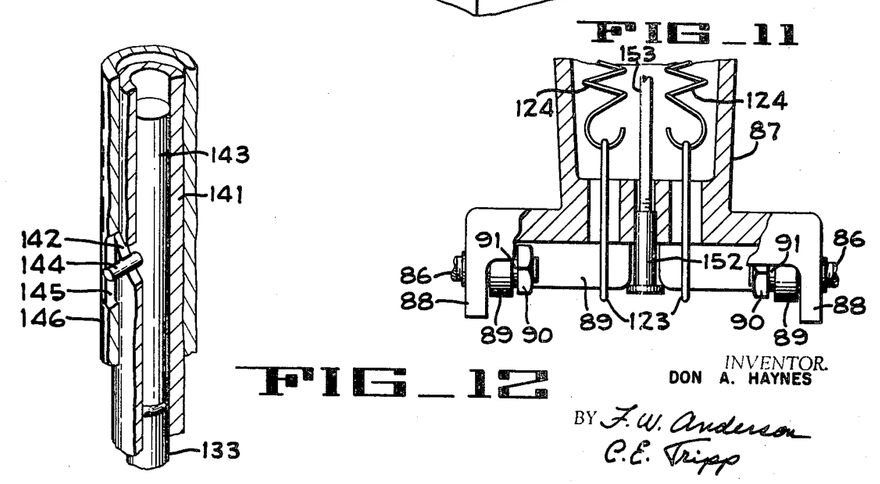
FIG. 11 is a view taken on the lines 11—11 of FIG. 3 with portions broken away.
FIG. 12 is a fragmentary view, in perspective, with parts broken away, of a portion of the operating handle.

As handle 87 moves forward, spring 76 pushes clutch member 68 forwardly, to raise links 89. Clutch member 68 pushes clutch member 59 forwardly to overcome the bias of spring 61 and urge the clutch member 59 into pressure member 44 to clamp the disc 47 against stop member 41. As links 89 rise, arm 100 is raised to its elevated position shown in FIG. 8. When operating arm 87 is in an upright position, link 89, to which the operating arm is connected by hook 123, is held in the position shown in solid lines in FIG. 3 by link 92 and link arms 71. The movement of link arms 71 is limited by engagement of stop screw 75 with the base. Additional further swinging movement of the arm into engagement with the tire is effected by the yielding of springs 124 by which hook 123 is connected to the operating arm as shown in FIGS. 10 and 11.

It will be noted that since the shaft 14, and the disc 47 carried thereby, oscillates in a substantially horizontal line to displace the disc horizontally with respect to the shaft, it is necessary to displace the disc on the same axis (which is the axis of the unbalance in the wheel) so that the position of the disc 47 with respect to the shaft 14 not only will indicate the magnitude of the unbalance but also the location thereof on the wheel. It is to assure that the flapper plate contacts the disc on the same axis as the oscillation of the shaft 14 that the shaft 101 on which abutment arm 100 is mounted is canted at an angle of, for example, 2 degrees. The canted mounting shaft of the abutment arm causes the arm to move down and in with respect to the disc so the flapper plate can contact the disc on the horizontal axis through the center of the disc. It should be noted that a slot 130 (FIGS. 4 and 6) is provided at the end of shaft 101 to permit rotation thereof, in one direction or the other, to shift arm 100 in one direction or the other, so that the arm can be precisely positioned to contact disc 47 on the horizontal axis through the center thereof.

As shown best in FIGS. 2, 10 and 13, the handle 87 has an indicator 131 mounted therein. The indicator 131 is a conventional, commercially available, indicator such as Type CE40 (½ inch range) of Tokyo Keisokuki Seisakusho Co. of Tokyo, Japan. The indicator 131 has a body 132, an upper cylindrical extension 133, and a lower cylindrical extension 134. The body portion 132 has mounted thereon a rotatable circular rim 135 in which a disc (not shown) is secured. A pointer shaft 136, extending from the body 132, passes through a central opening in the disc and has a pointer 137 mounted thereon in front of the disc. A special dial face 138, which is not a conventional part of the indicator, is secured to the disc behind the dial pointer 137. A circular casing 139, having a glass face therein, is secured to rim 135.

The lower extension 134 of the indicator is slidably received in a guide sleeve 140 which is mounted in the arm 87. The upper extension 133 of the indicator is received in an actuating sleeve 141 (see FIG. 12) which has a diagonal slot 142 extending partially around the sleeve. A plunger 143 is received in sleeve 141 above indicator extension 133. The plunger 143 has a pin 144 extending from one side which passes through slot 142 into an axially extending slot 145 in an outer sleeve 146. The outer sleeve 146 is threadedly received in the arm 87, and the actuating sleeve extends above the outer sleeve to receive a knob 147 thereon. A handle grip 148 is received over the outer sleeve 146. Thus rotation of knob 147, which defines a control member, rotates actuating sleeve 141 to cam the plunger 143 down by means of pin 144.

Depression of plunger 143 downwardly moves the indicator 131 (including body 132 and extensions 133, 134) downwardly a corresponding amount against the bias of spring 150, which is mounted on lower extension 134 between the indicator body and guide sleeve 140. The indicator 131 has an operating plunger 151 slidably received therein and extending from the lower extension 134.

Plunger 151 is operatively connected to the pointer shaft 136 to rotate the shaft, and dial pointer 137, on movement of plunger 151 in or out of the indicator body 132. A sensing finger 152, slidably received in the bottom of the arm 87 as shown in FIGS. 3 and 11, has a flat end face extending below the arm. Finger 152 is connected by a stiff rod 153 to plunger 151 to form, in effect, an extension of the plunger. Thus, when the indicator is lowered, the end face of the sensing finger drops into engagement with the disc 47 which has ben clamped in off centered relation to the shaft 14.

To operate the mechanism disclosed herein, a wheel is mounted on the shaft 14 and bolted to plate 30. The operating handle 87 is pushed to the rear to retract clutch member 68, and the wheel is allowed to rotate so the heavy portion of the wheel drops. A counter weight, of a size determined by trial and error, is placed at the top of the wheel to achieve static balance. The clutch member is retracted at this time to permit a more free rotation of shaft 14. After the static balance is completed, the handle is moved to the upright position shown in FIG. 1 to advance clutch member 68 and hold shaft 14 against oscillation.

A wheel spinner 160 is mounted on an arm 161 which is pivotally received in socket 162 on the base 12. The wheel spinner has an electric motor (not shown) which drives a spindle 163. The wheel spinner is swung by handle 164 to bring spindle 163 against the tire to rotate the wheel.

After the wheel is spinning, the spinner is removed from the wheel, but the wheel will continue to spin until braked. The operating handle 87 is then slowly pushed to the rear. Movement of the handle automatically effects the following operations in the sequence indicated:

(1) Actuates the tail stock 63 to retract clutch member 68 and free the head 13 for oscillation about axis B;
(2) At same time, releases annular disc 47 for lateral shifting with respect to shaft 14;
(3) Lower abutment arm 100 to bring flapper plate 110 into contact with annular disc 47 on the horizontal axis thereof;
(4) At the same time, the fluttering of signaling rod 120 begins.

When the fluttering of rod 120 terminates, the operating handle 87 is pulled forwardly to the wheel, effecting the following operations in the sequence indicated:

(1) Raises abutment arm 100 away from annular disc 47;
(2) Actuates tail stock 63 to advance clutch member 68 to restrain the head from oscillating;
(3) At same time, clamps annular disc 47 in position displaced from centered relationship with shaft 14;
(4) Brakes the wheel.

At this time, the knob 147 is turned to lower the sensing finger 152 into engagement with the annular disc 47. The wheel is then turned slowly by hand. At this time, the shaft 14 is restrained, and the disc is off center with respect to shaft 14, so the dial pointer 137 will fluctuate slowly between two extreme positions.

Dial 138 is divided into three sectors 138a, 138b, and 138c, as shown best in FIG. 13, each extending approximately 120 degrees. Sector 138a has a scale 170a calibrated in ounces of weight neded to balance small wheels; sector 138b has a scale 170b calibrated in ounces of weight needed to balance medium wheels; and sector 138c has a scale 170c calibrated in ounces of weight needed to balance large wheels. If, for example, a medium size tire is being balanced, rim 135 is rotated to rotate dial 138 until the extreme left end of sector 138b (the zero point on that dial sector) is at the extreme left hand point to which dial pointer moves as it slowly fluctuates. Then the extreme right hand point to which the dial pointer fluctuates gives the number of ounces which must be added to each side of the rim of the wheel to balance the wheel. When the wheel is at the position which gives the maximum reading (dial pointer 137 in extreme right hand position) the weight indicated is placed on the outside of the rim at the top of the wheel. The same weight is placed on the inside of the rim at the bottom of the wheel. Thus, a balancing couple is added to the wheel which compensates for the couple which caused the wobble of the wheel and the oscillation of the head. The adidition of these two weights at diametrically opposed points on the wheel relative to the axis of rotation thereof does not destroy the static balance of the wheel previously achieved.

Although the best mode contemplated for carrying out the present invention has been herein shown and described it will be apparent that modification and variation may be made without departing from what is regarded to be the subject matter of the invention as set forth in the appended claims.

Having completed a detailed description of the invention so that those skilled in the art could practice the same, I claim:

1. A wheel balancing device comprising in combination:
 (a) a base,
 (b) a head,
 (c) a wheel shaft journaled in said head, one end of the shaft extending outside the head to receive a wheel for balancing,
 (d) means including a pivot shaft mounted on a pivot axis inclined with respect to said wheel shaft to mount the head on the base for oscillation of the head relative to the base when an unbalanced wheel is rotated on the shaft,
 (e) a disc,
 (f) means including a pressure member on the wheel shaft to mount said disc on the wheel shaft, said disc laterally shiftable relative to the wheel shaft when unclamped,
 (g) an abutment member in the base operable when actuated to engage the disc as the wheel shaft oscillates to displace the disc relative to the wheel shaft an amount equal to the oscillations of the shaft,
 (h) a clamp mounted in the base for movement relative to the pressure member, and
 (i) means connected to the clamp and the abutment member both for moving the clamp relative to the pressure member and for actuation of the abutment member.

2. The apparatus of claim 1 in which the means connected to the clamp and the abutment member includes a control handle mounted on the base to actuate said abutment member and the clamp.

3. The apparatus of claim 2 in which said control handle is movable into engagement with a tire on the wheel to brake the wheel.

4. The apparatus of claim 1 including a sensing member mounted in the base for movement when actuated to engage the clamped disc, and a gauge having means connected to the sensing member to give a reading of the wheel unbalance.

5. The apparatus of claim 4 in which the gauge has a plurality of scales, each calibrated for a particular wheel size.

6. The apparatus of claim 1 including a signaling member pivotally connected to the abutment member for fluttering movement thereon when engaged by a laterally shifted disc.

7. A wheel balancing device comprising in combination:
 (a) a base,
 (b) a head,
 (c) a wheel shaft journaled in said head, one end of the shaft extending outside the head to receive a wheel for balancing,
 (d) means including a pivot shaft mounted on a pivot axis inclined with respect to said wheel shaft to mount the head on the base for oscillation of the head relative to the base when an unbalanced wheel is rotated on the shaft,
 (e) an annular disc received on the shaft,
 (f) means including a pressure member and a backing member to hold the disc in a fixed longitudinal position on the shaft, said disc laterally shiftable relative to the shaft when the disc is unclamped,
 (g) an abutment member in the base operable when actuated to engage the disc as the wheel shaft oscillates to displace the disc relative to the wheel shaft an amount equal to the oscillations of the shaft,
 (h) a signaling member mounted on said abutment member to indicate full displacement of said disc,
 (i) a clamp mounted in the base,
 (j) complementary clutch members mounted, respectively, on the wheel shaft and the clamp to grip the shaft and terminate oscillations thereof on actuation of the clamp, said clutch member on the wheel shaft engaging the pressure member to clamp said disc when the clamp is actuated,
 (k) a control handle mounted on the base, said control handle operable to engage a tire on the wheel to stop the wheel,
 (l) means connected to the handle and to the clamp, said means including a member connected to the abutment member for operation of the clamp and the abutment member on actuation of the handle,
 (m) a sensing member operable when actuated to engage the clamped displaced disc, and
 (n) a gauge responsive to the sensing member to give a reading of disc displacement.

8. In a wheel balancing device, the combination comprising:
 (a) a base,
 (b) a shaft to receive a wheel for balancing,
 (c) means pivotally mounted on the base for supporting said shaft for oscillation when an unbalanced wheel is rotated thereon,
 (d) an annular disc mounted on the shaft,
 (e) means on the shaft for exerting a predetermined frictional force on the disc of a magnitude to permit lateral shifting of the disc relative to the shaft,
 (f) means mounted in the base for engaging the disc as the shaft oscillates to displace the disc from a centered position with respect to the shaft,
 (g) a clamp mounted in the base for movement relative to said disc,
 (h) means connected to the clamp for moving the clamp, and
 (i) means mounted on the shaft between the clamp and the disc for engagement by the clamp to terminate oscillation of the shaft and for movement on the shaft by the clamp for increasing said predetermined frictional force on said disc.

9. In a wheel balancing device, the combination comprising:
 (a) a base,
 (b) a head pivotally mounted on the base,
 (c) a shaft mounted in the head to receive a wheel for balancing,
 (d) an annular disc mounted on the shaft,
 (e) means including a spring mounted on the shaft for exerting a predetermined frictional force on the disc of a magnitude to permit lateral shifting of the disc relative to the shaft,
 (f) means mounted in the base for engaging the disc as the shaft oscillates to displace the disc from a centered position with respect to the shaft,
 (g) a clamp mounted in the base for movement relative to the disc, said clamp having a member with a conical surface facing the disc, (h) means connected to the clamp for moving the clamp, and (i) an annular member mounted on the shaft between the disc and the clamp, said member having a conical surface complementary to the conical surface on the clamp for engagement thereby to terminate oscillation of the shaft, said annular member shiftable on the shaft for increasing said predetermined frictional force on the disc.

10. In a wheel balancing device, the combination comprising:
(a) a base,
(b) means to pivotally mount said shaft on the base for oscillation thereof when an unbalanced wheel is rotated thereon,
(c) an annular disc received on the shaft,
(d) means including a pressure member on the shaft to hold the disc in a predetermined longitudinal position on the shaft, said disc laterally shiftable relative to the shaft when unclamped,
(e) an abutment member mounted in the base to engage the disc as the shaft oscillates to displace the disc from a centered position with respect to the shaft,
(f) a clamp mounted in the base and having a movable member to center the shaft and actuate said pressure member to clamp the disc in the displaced position,
(g) a sensing member mounted in the base to engage the clamped disc for an indication of the extent of displacement thereof and the extent of unbalance of the wheel, and
(h) means mounted in the base and connected to the abutment member and the clamp member to actuate said members.

11. In a wheel balancing device, the combination comprising:
(a) a base,
(b) a head pivotally mounted on the base,
(c) a wheel shaft mounted in the head to receive a wheel for balancing,
(d) an annular disc mounted on the shaft,
(e) means including a spring mounted on the shaft for exerting a predetermined frictional force on the disc of a magnitude to permit lateral shifting of the disc relative to the shaft,
(f) an abutment member mounted in the base for movement toward the wheel shaft to engage the disc on the shaft as the shaft oscillates and to displace the disc from a centered position with respect to the shaft,
(g) a clamp shaft journaled in the base in generally coaxial alignment with the wheel receiving shaft,
(h) a pair of conical clutch member mounted, respectively, on the clamp shaft and the wheel shaft for engagement on advance of the clamp shaft, said clutch member on the wheel shaft shiftable thereon to increase the frictional force on the disc to lock the disc with respect to the wheel shaft, and
(i) means connected to the clamp shaft for advancing the clamp shaft to engage the clutch members and shift the clutch member on the wheel shaft.

12. In a wheel balancing device, the combination comprising:
(a) a base,
(b) a head pivotally mounted on the base,
(c) a wheel shaft mounted in the head to receive a wheel for balancing,
(d) an annular disc mounted on the shaft,
(e) means mounted on the shaft for exerting a predetermined frictional force on the disc of a magnitude to permit lateral shifting of the disc relative to the shaft,
(f) an abutment member mounted in the base for movement toward the wheel shaft to engage the disc on the shaft as the shaft oscillates and to displace the disc from a centered position with respect to the shaft,
(g) a clamp shaft journaled in the base in generally coaxial alignment with the wheel receiving shaft,
(h) a pair of conical clutch members mounted, respectively, on the clamp shaft and the wheel shaft for engagement on advance of the clamp shaft, said clutch member on the wheel shaft shiftable thereon to increase the frictional force on the disc to lock the disc with respect to the wheel shaft,
(i) a handle mounted on the base for movement from and toward the wheel, said handle engaging the wheel at the extreme forward position of the handle, and
(j) linkage interconnecting the clamp shaft, the abutment member, and the handle to coordinate the movement of the abutment member and the clamp shaft on movement of the handle.

References Cited
UNITED STATES PATENTS

| | | | |
|---|---|---|---|
| 1,486,115 | 3/1924 | Allen | 73—475 |
| 2,177,252 | 10/1939 | Hanson | 73—473 |
| 2,196,031 | 4/1940 | Schildmeier | 73—476 |
| 2,322,939 | 6/1943 | Inman | 73—473 |
| 2,334,991 | 11/1943 | Castiglia | 73—471 |
| 2,341,141 | 2/1944 | Greenleaf et al. | 73—473 |
| 2,378,018 | 6/1945 | Inman | 73—473 |

JAMES J. GILL, Primary Examiner

H. GOLDSTEIN, Assistant Examiner

PO-1050
(5/69)

UNITED STATES PATENT OFFICE
CERTIFICATE OF CORRECTION

Patent No. 3,535,938          Dated    Oct. 27, 1970

Inventor(s)    D.A. HAYNES

It is certified that error appears in the above-identified patent and that said Letters Patent are hereby corrected as shown below:

Column 4, lin 16 - change "3" to -- 63 --. Column 5, line 4 - change "cantered" to -- canted --. Column 5, line 15 - change "15" to -- 115 --. Column 8, line 10 - change "ben" to -- been - Column 8, line 40 - change "Lower" to -- Lowers --. Column 11, line 54 - change "member" to -- members --.

Signed and sealed this 28th day of December 1971.

(SEAL)
Attest:

EDWARD M.FLETCHER,JR.      ROBERT GOTTSCHALK
Attesting Officer           Acting Commissioner of Patents